United States Patent [19]

Boudreau

[11] 4,123,035
[45] Oct. 31, 1978

[54] CONDUIT COUPLING MEANS FOR MILKING SYSTEMS AND METHOD OF MAKING SAME

[76] Inventor: Archie E. Boudreau, P.O. Box 1125, Modesto, Calif. 95353

[21] Appl. No.: 881,246

[22] Filed: Feb. 27, 1978

Related U.S. Application Data

[63] Continuation-in-part of Ser. No. 850,665, Nov. 11, 1977, abandoned, which is a continuation of Ser. No. 764,805, Feb. 2, 1977, abandoned.

[51] Int. Cl.$^2$ ............................................. F16L 41/00
[52] U.S. Cl. ....................................... 251/146; 29/150; 29/157 R; 29/434; 285/197; 285/DIG. 2
[58] Field of Search ......... 285/197, 198, 199, DIG. 2; 251/146; 137/15; 29/434, 150, 157 R

[56] References Cited

U.S. PATENT DOCUMENTS

| | | | |
|---|---|---|---|
| 2,783,771 | 3/1957 | Thomas | 285/197 X |
| 3,010,739 | 11/1961 | Boudreau | 285/197 |
| 3,480,252 | 11/1969 | Simons | 251/146 |
| 3,533,650 | 10/1970 | Smith | 285/197 |
| 3,872,882 | 3/1975 | Fjermestad et al. | 251/146 X |

Primary Examiner—Thomas F. Callaghan
Attorney, Agent, or Firm—Phillips, Moore, Weissenberger, Lempio & Majestic

[57] ABSTRACT

An improved device for enabling a small diameter milking hose to be removably connected to a larger diameter manifold of a milking system through an opening in the wall thereof and for automatically closing the opening through the wall of the manifold when the milking hose is not connected thereto is disclosed. The method of making such device primarily from flat spring steel stock by simple stamping and forming techniques is described and preferred structural features of the completed device providing for optimum performance in use, inexpensive manufacture and ease of application and removal from the larger conduit are described.

17 Claims, 17 Drawing Figures

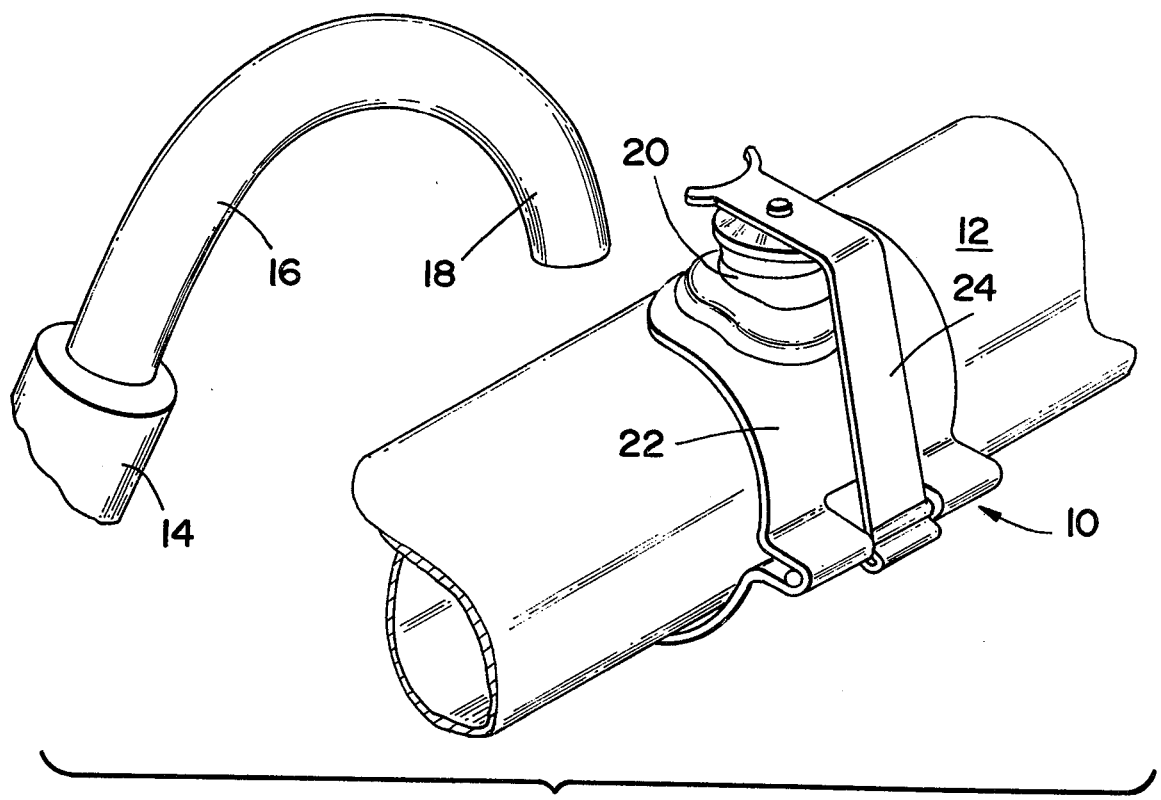
FIG_1
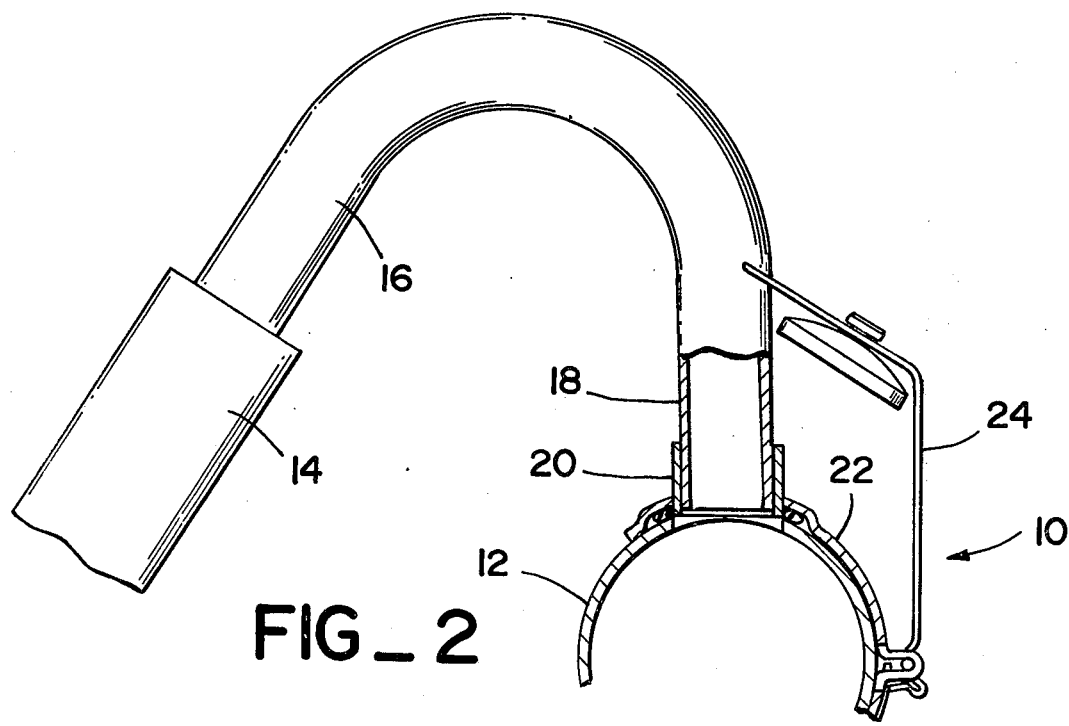
FIG_2

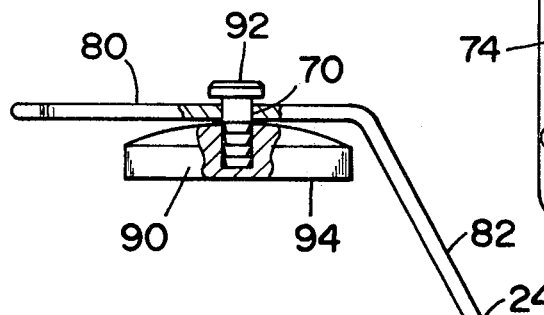
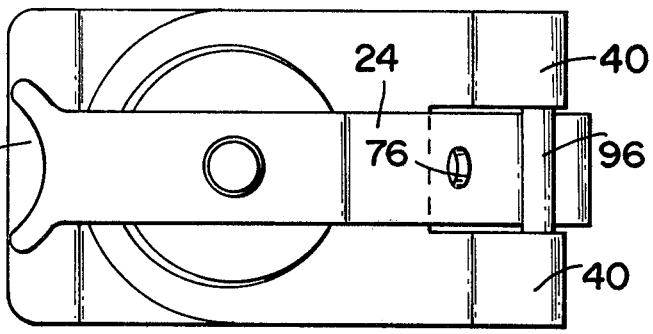
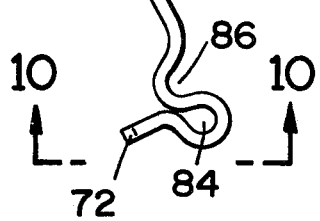
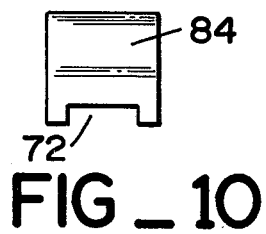
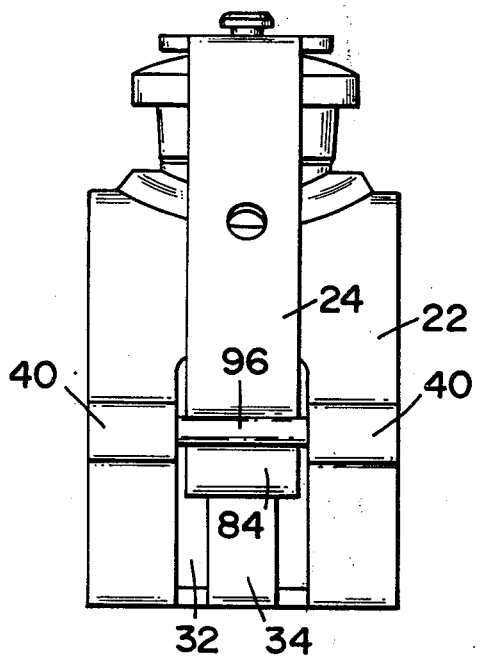
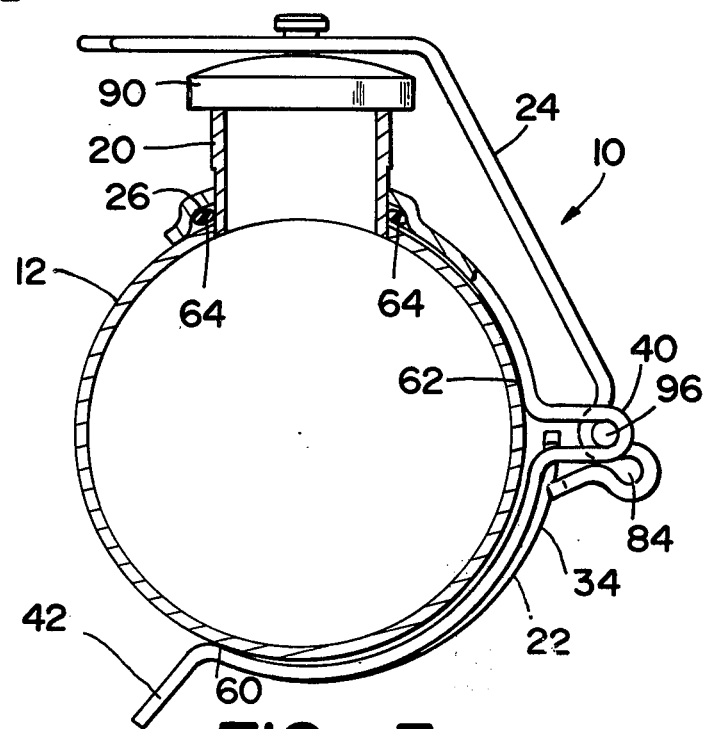
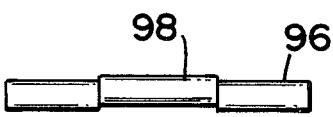

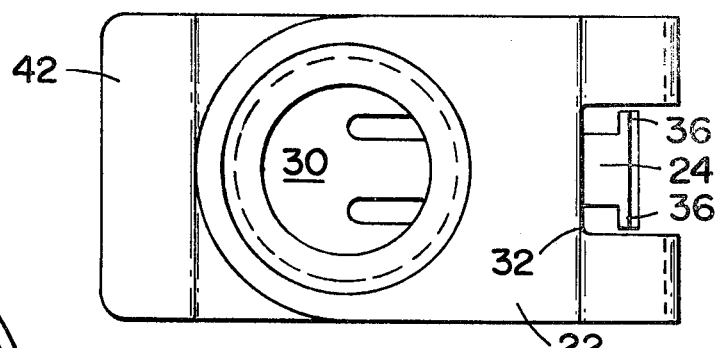
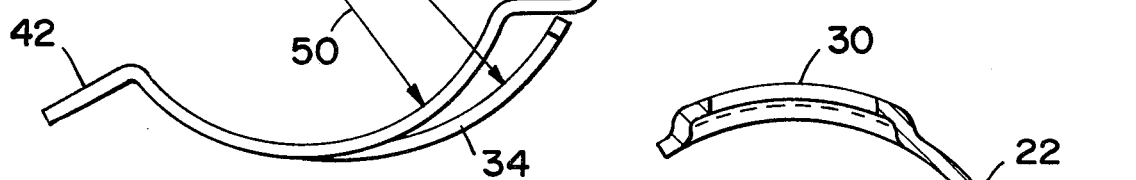
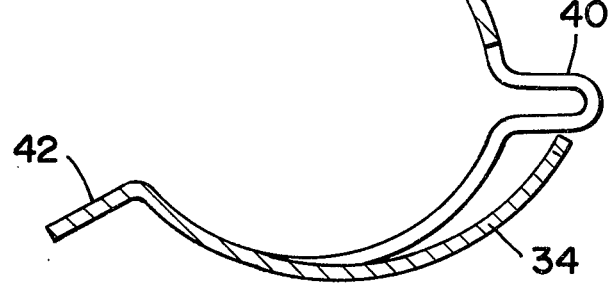
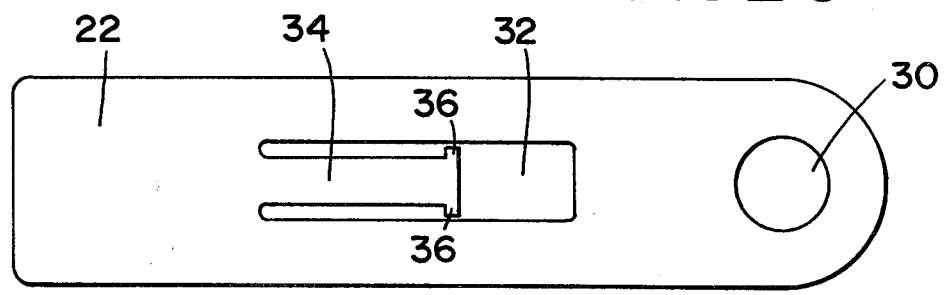
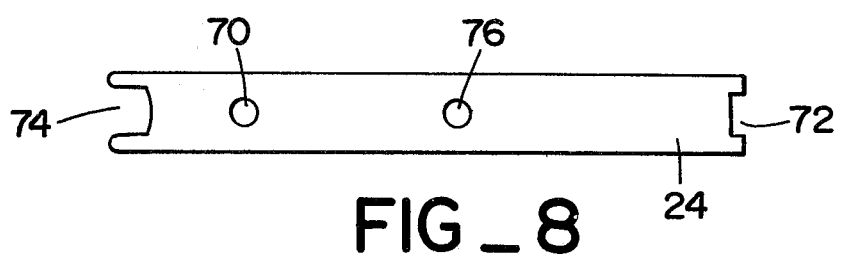

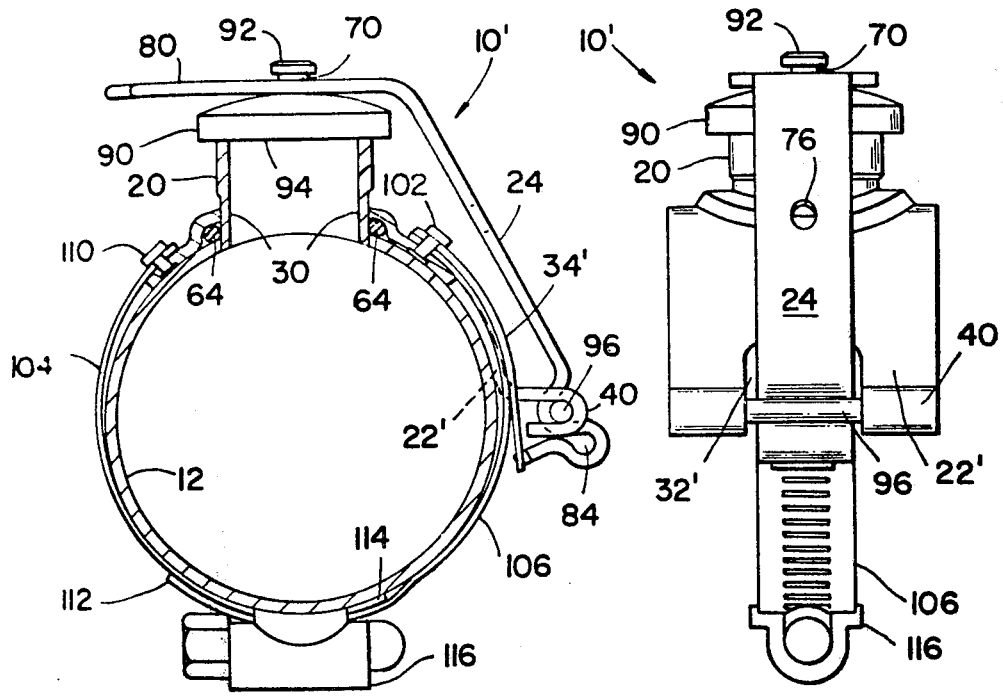
FIG_14  FIG_15
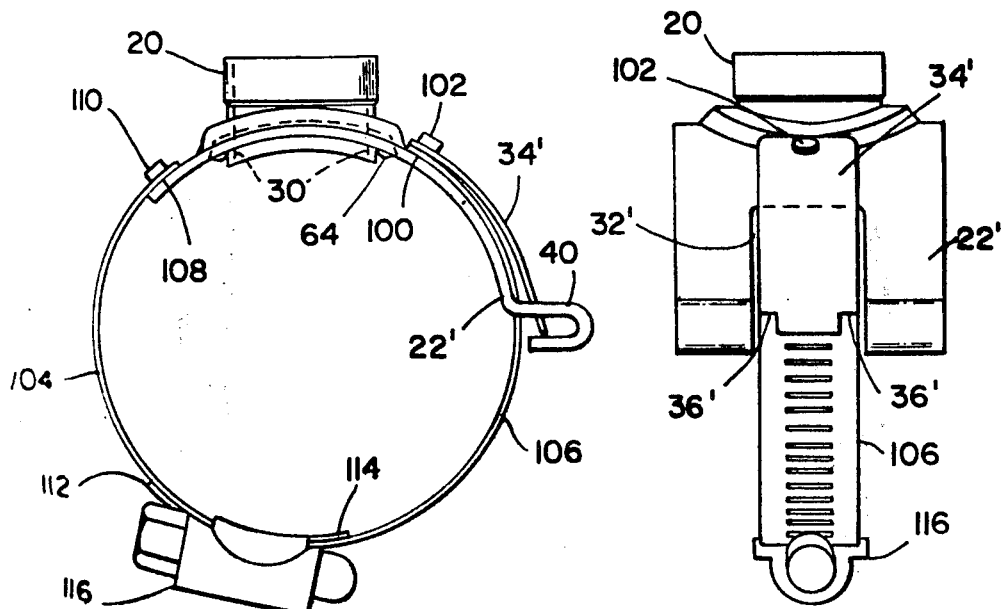
FIG_16  FIG_17

CONDUIT COUPLING MEANS FOR MILKING SYSTEMS AND METHOD OF MAKING SAME

CROSS-REFERENCE TO RELATED APPLICATIONS

This invention is a continuation-in-part of copending application Ser. No. 850,665 filed Nov. 11, 1977, now abandoned which is a continuation of application Ser. No. 764,805 filed Feb. 2, 1977, now abandoned.

BACKGROUND OF THE INVENTION

This invention relates to coupling means for use in milking systems and more particularly to an improved coupling means which may be removably attached to the manifold of a milking system at any desired location.

Vacuum operated milking machines for use in dairy operations to milk many cows simultaneously are well known in the prior art. Such machines are each connected to a common manifold and the milk drawn from each cow flows through the manifold into a suitable milk receiving tank maintained at sub-atmospheric pressure.

The various dairy codes and regulations with respect to milking systems are quite strict as to the apparatus involved and generally require that the manifold be made of stainless steel tubing. In addition, the codes often require that if the manifold is over a stated maximum length, the individual valve connections thereto must be removable therefrom. Because of these requirements, much trouble has been encountered in providing a suitable satisfactory connection between the milking machines and the manifold.

The manifold being of stainless steel tubing is a difficult material to work with in the field and yet the locations at which the milking machines are to be connected to the manifold will vary for each installation depending on the architecture of the structure in which the system is to be installed as well as many other variable factors. In addition it is often desirable to relocate or add further couplings to the manifold after the system has been installed. Thus, it is not possible to provide couplings to the manifold prior to installation but instead the couplings to the manifold for the milking machines must be provided after the system has been installed.

The most practicable solution has been to form openings through the side wall of the manifold tube after the manifold tube has been installed in the structure with such openings being formed as and where needed or desired. Of course the thinness of the tube wall precludes the use of threaded fittings thereto and thus standard pipe connections cannot be used.

Various clamping devices have been proposed in the prior art for mounting coupling devices to the manifold by pressing the coupling means tightly against openings in the manifold so as to seal the coupling means to the opening. It has been found, however, that if such clamping means are designed to hold the coupling means tightly enough against the manifold so as to form a seal therebetween, they either cannot be easily removed from the manifold when required, or else the coupling device is expensive and complicated to manufacture. It is often desired to provide additional couplings which are not in constant use and it is, of course, necessary that such couplings when they are not in use provide an air tight seal so that no air can enter the system as air will cause contamination and oxidation of the milk.

It is a principal object of this invention to provide a coupling to a manifold which provides optimum performance in use and yet is inexpensive to manufacture and may be quickly and easily applied to and removed from the manifold.

SUMMARY OF THE INVENTION

Briefly, this invention is an improvement in milking systems in which a milking hose is connected to a manifold having a convex outer surface through an opening in such surface by means of a connector body matingly fitted through such opening in the manifold and clamp means for mounting the tubular body to the manifold. According to the improvement of this invention, the connector body comprises an elongated member formed to provide a generally curved cross-section dimensioned to conform to the external periphery of the tubular manifold and having a circular opening at one end thereof for receiving a tubular body therethrough. The elongated member has a generally rectangular opening therethrough spaced from said circular opening and is formed with an externally protruding portion extending transversely of the elongated member at a point spaced from one end of the rectangular opening. The tubular body is fixed through the circular opening at one end of the elongated member and projecting radially inward of the curved cross-section of such elongated member. An O-ring surrounds the inwardly projecting tubular body within the curved cross-section of the elongated member. A generally "L" shape closure arm is provided which closure arm has transverse dimensions adapted to be received in the rectangular opening of the elongated member. One leg of the closure arm is adapted to selectively close the outwardly projecting end of the tubular connector body and the end of the other leg of the closure arm is provided with hinge means. A pin is provided through the protruding portion of the elongated member and the hinge means of the closure arm is engaged with such pin. A spring means acting between the elongated member and the closure arm is provided to cause the closure arm to resiliently close the externally projecting end of the tubular connector body.

BRIEF DESCRIPTION OF THE DRAWING

The foregoing and other objects and features of this invention will be more fully understood from a reading of the following detailed description of the preferred embodiments thereof in conjunction with the attached drawings wherein:

FIG. 1 is a fragmentary perspective view of the manifold of a milking system with a coupling means according to this invention mounted thereon and including a perspective view of the end of a hose of a milking machine which is to be coupled to the manifold through the coupling means of this invention.

FIG. 2 is a fragmentary view partially in cross-section showing the end of the hose of the milking machine coupled to the manifold through the coupling means of this invention.

FIG. 3 is an enlarged cross-sectional view showing the coupling means according to one preferred embodiment of this invention mounted on a conduit of the coupling system.

FIG. 4 is a reduced top plan view of the elongated member of a coupling means according to one embodiment of this invention after completion of punching operations thereon but prior to forming thereof.

FIG. 5 is a cross-sectional view of the elongated member of FIG. 4 after the forming operations thereon have been completed.

FIG. 6 is a top plan view of the formed elongated member as shown in FIG. 5.

FIG. 7 is an end view similar to the cross-sectional view of FIG. 5, showing certain important parameters of the forming operation.

FIG. 8 is a reduced plan view of the closure arm of a coupling means according to one embodiment of this invention after punching operations have been completed thereon but prior to forming thereof.

FIG. 9 is a side view partially in cross-section showing the closure arm of FIG. 8 after completion of the forming operations on the closure arm.

FIG. 10 is a view taken along lines 10—10 of FIG. 9.

FIG. 11 is a view similar to FIG. 6 but showing the fully assembled coupling means comprising the formed elongated member and closure arm.

FIG. 12 is a back view in elevation of the fully assembled coupling means of FIG. 3 showing the pivot connection between the closure arm and elongated member.

FIG. 13 is a view in elevation of the pin of the pivot means for interconnecting the closure arm and elongated member of the coupling means of FIG. 12.

FIG. 14 is an enlarged cross-sectional view showing the coupling means of a second preferred embodiment of the present invention mounted on a conduit of the milking system.

FIG. 15 is a back view in elevation of the fully assembled coupling means of the second embodiment showing the pivot connection between the closure arm and the elongated member.

FIG. 16 is an end view of the second embodiment similar to the cross-sectional view of FIG. 14 showing certain important parameters.

FIG. 17 is a back view of the second embodiment in elevation similar to FIG. 15 illustrating an important component of the invention.

DETAILED DESCRIPTION OF THE PREFERRED EMBODIMENTS

Referring to FIG. 1, a first preferred embodiment 10 of the coupling means according to the teaching of this invention is shown in perspective, mounted for use on the manifold 12 of a milking system. The manifold 12 comprises an elongated stainless steel tube, a portion of which is shown in FIG. 1. Also shown in FIG. 1 is the end portion of the hose 14 leading to a milking machine (not shown) together with the coupling nozzle 16 which is mounted in the end of the hose 14. The hose 14 is conventionally made of rubber and the coupling nozzle 16 may be made of a suitable plastic tubing bent as shown. The plastic of which the coupling nozzle is made is a rigid plastic such as nylon and one end thereof is received within the hose 14 with an interference fit to provide mechanical attachment and an airtight seal therebetween. The exterior surface of the free end 18 of the coupling nozzle 16 is tapered from its normal diameter to a smaller diameter at the extreme end thereof.

The coupling means 10 comprises a tubular connector body 20, adapted to be matingly fitted through an opening in the wall of the manifold 12 as best shown in FIG. 2. The internal surface of the tubular connector body is tapered to receive the tapered end 18 of the coupling nozzle 16 to provide a mechanical airtight joint therebetween, as best shown in FIG. 2. According to this invention, the tubular connector body 20 is maintained in its matingly fitted relationship through the opening in the manifold 12 by an elongated member 22 made of flat spring steel stock formed into a generally "C" shaped cross-section to be compressively received about the exterior surface of the manifold 12. The tubular connector body is mechanically fixed through a circular opening at one end of the member 22 and a closure arm 24 is pivotally mounted on the member 22 and resiliently biased to normally close the free end of the tubular connector body 20. As best shown in FIG. 2, the closure arm 24 is adapted to be automatically moved out of the way when the coupling nozzle 16 is inserted into the tubular connector body 20.

Referring to FIG. 3, an enlarged view of the coupling means 10 as mounted on the manifold 12 with the closure arm 24 in its normal position when no milking machine is connected thereto is shown. The manifold 12 is shown in cross-section together with the tubular connector body 20 and a portion of the enlongated member 22 adjacent the tubular connector body 20. The remainder of the coupling means 10 is shown in full. As best shown in FIG. 3, a portion of the elongated member 22 surrounding the circular opening therein which receives the tubular connector body 20 is cupped outwardly. The tubular connector body 20 projects inwardly of the "C"-shaped elongated member 22 a sufficient distance to be matingly fitted through the opening in the manifold 12. A rubber O-ring is received over the inwardly projecting end of the tubular connector body 20 and bottomed against the cupped portion of the elongated member 22 to provide an airtight seal when the tubular connector body 20 is fitted through the opening in the manifold 12 and compressively held in such position by the elongated member 22. The tubular connector body 20 is, of course, mechanically fixed through the circular opening in the elongated member 22 and its inner end may be formed as shown in FIG. 3 to match the inner surface of the manifold 12.

Referring to FIG. 4, the elongated member 22 according to the first embodiment of this invention, is made of flat spring steel stock. The circular opening 30 in which the tubular connector body 20 is fixed, as well as a generally rectangular opening 32, are preferably formed in the flat spring steel stock by a punching operation prior to forming the elongated member 22 into its generally "C"-shape cross-section. As best shown in FIG. 4, the generally rectangular opening 32 extends along the axis of elongation of the member 22 and includes a tongue 34 which projects from one end of the opening 32 a substantial distance along the axis of elongation of the member 22 less than the full length of the opening 32. The free end of the tongue 34 is formed with shoulders 36 providing a generally "T"-shaped stop means, as will be more fully described hereinafter. The cupped portion of the elongated member 22 surrounding the circular opening 30 may also be formed during the punching operation.

Referring to FIG. 5, the elongated member 22 is then formed into its desired "C"-shaped cross-section with the cupped portion surrounding the circular opening 30 facing inwardly. During such forming steps, an outwardly projecting bight 40 is formed in the elongated member transversely of its axis of elongation at a point spaced from the free end of the tongue 34 but including the balance of the generally rectangular slot 32. An outwardly projecting lip 42 may also be formed at the end of the elongated member 22 remote from the circular opening 30.

Referring to FIG. 6, it will be seen that the tongue 34 including the shoulders 36 thereon, is free to flex with respect to the balance of the elongated member 22. More importantly, the tongue 34 together with the shoulders 36 is freely received within the opening 32.

Referring to FIG. 7, according to an important aspect of this invention, the portion of the elongated member 22 from the end thereof adjacent the circular opening 30 to the center of the bight 40 is formed to provide an internal radius equal to the external radius of the manifold 12 about the center of the manifold 12 when the elongated member 22 is received thereon. The balance of the elongated member 22 from the center of the bight 40 to the end thereof remote from the circular opening 30, is formed on a smaller radius indicated by the arrow 50 about a center 52 displaced from the center of the manifold 12 when the elongated member 22 is received thereon toward the bight 40 and toward the circular opening 30. Finally, the tongue 34 is formed with an internal radius indicated by the arrow 54 which is larger than the radius of the manifold 12 about a center 56 which is displaced still further from the center of the manifold when the elongated member 22 is received thereon toward the bight 40 and the circular opening 30.

Referring again to FIG. 3, it will be seen that such formation of the elongated member 22 provides engagement between the elongated member 22 and the manifold 12 at a first point 60 adjacent the end thereof remote from the circular opening 30 and tubular connector body 20, a second point 62 at the bight 40 on the side thereof adjacent the circular opening 30 and tubular connector body 20 and at points 64 distributed about the O-ring 26 which is compressively captured against the exterior surface of the manifold 12 by the elongated member 22. It has been found that this interrelationship between the elongated member 22 and the manifold 12 is important in establishing a seal at the point where the tubular body 20 extends through the manifold 12 and in maintaining stable mechanical positioning of the coupling means 10 on the manifold 12 in operation while permitting the coupling means 10 to be removed from and subsequently remounted on the manifold 12 by hand and without the use of any special tools.

According to the first preferred embodiment of this invention, the elongated member 22 is made of corrosion resistant steel such as CRES-17-7 PH stock made of 17% chrome, 7% nickel and the balance iron. The elongated member 22 is punched forward and the tubular connector body is heliarc welded in the circular opening 30 thereof. Subsequently, the elongated member is heat treated to provide the desired spring characteristics. For example, according to one embodiment of this invention, the elongated body is heated to 1400° F. (760° C.) for one hour and 30 minutes and then air cooled to about 55° F. (12° C.) within one hour. The heat treated elongated body 22 is then aged at 1050° F. (565° C.) for about 90 minutes.

Referring to FIG. 8, the closure arm 24 of the coupling device 10 according to this invention may also be made from flat stock. For example, the closure arm may be made of 16 gauge flat stock of type 304 stainless steel. The flat stock is punched to provide a first circular opening 70 adjacent one end thereof and a notch 72 in the other end thereof. The closure arm 24 is dimensioned to be freely received through the generally rectangular opening 32 in the elongated member 22 and the notch 72 is dimensioned to receive the tongue 34 with a depth about equal to the thickness of the elongated member 22. A second notch 74 of substantially greater depth is formed in the end of the closure arm 24 adjacent the first circular opening 70 and a second circular opening 76 may be formed through the closure arm 24 intermediate its ends. The notches 72 and 74 and the openings 70 and 76 may be provided by appropriate punching operations, for example, and subsequently the closure arm is formed to provide a generally "L"-shaped cross-section, as best shown in FIG. 9.

Referring to FIG. 9, the closure arm 24 is formed to provide a "L"-shape including a first leg 80 having the opening 70 disposed generally centrally thereof. The second leg 82 of the "L"-shape has the second opening 76 disposed generally centrally thereof and the free end of the second leg 82 is formed to provide pivot means adapted to cooperate with the bight 40 in the elongated member 22 to provide a hinging interconnection between the closure arm 24 and the elongated member 22. Thus, according to this embodiment of the invention, a bight 84 is formed adjacent the free end of the leg 82 providing a transversely extending channel 86 on the side of the bight 84 remote from the free end of the leg 82 and with a lip 88 including the notch 72 in the free end of the leg 82 extending in the opposite direction from the channel 86 generally parallel to leg 80.

As best shown in FIG. 9, a plastic cap 90 is mounted on the leg 80 of the "L"-shape closure arm 24 toward the inside thereof by means of a rivet 92 which passes through the first opening 70 and is received within a bore in the cap 90. The cap 90 is preferably loosely mounted on the leg 80 and has a planar surface 94 adapted to contact the outwardly projecting end of the tubular connector body 20 as best shown in FIG. 3.

After forming as described hereinabove, the closure arm 24 and elongated member 22 are assembled to each other as shown in FIGS. 11 and 12 by means of a pivot pin 96 shown in FIG. 13. Thus, the free end of the leg 82 of the closure arm 24 is positioned within the rectangular opening 32 in the elongated member 22 with the channel 86 aligned with the bight 40 and the notch 72 in engagement with the tongue 34. The pin 96 is then inserted through the bight 40 of the elongated member 22 in engagement with the channel 86 of the closure arm 24. The tongue 34 will resiliently urge the channel 86 of the closure arm 24 into compressive contact with the pin 96 and will also tend to pivot the closure arm about the pin to bring the planar surface 94 of the cap 90 into compressive contact with the outwardly projecting end of the tubular connector body 20.

As will be best understood from FIG. 3 and by comparing FIG. 10 to FIG. 4, the notch 72 in the end of the closure arm 24 will cooperate with the shoulders 36 on the tongue 34 to limit rotational movement of the closure arm 24 when the cap 90 is removed from the projecting end of the tubular connector body 20 is permit insertion of the coupling nozzle 16 therein. Also, as shown in FIG. 13, the central portion 98 of the pivot pin 96 may be slightly upset to insure that once the pivot pin has been inserted in the bight 40 of the elongated member 22 with the channel 86 of the closure arm 24 compressively urged thereagainst by the resilient tongue 34, such pivot pin 96 will be captured against axial movement and thus cannot slip out of the desired engagement with the bight 40 and channel 86.

The closure arm 24 is preferably not subjected to heat treatment for hardening the same and thus it is possible to bend the closure arm 24 slightly to insure proper seating of the cap 90 on the projecting end of the tubular connector body 20. The second opening 76 through the leg 82 of the closure arm 24 enables a slight bending of the closure arm 24 under the influence of sufficient force to facilitate the desired adjustment. In addition, and referring specifically to FIG. 11, the notch 74 in the free end of the leg 80 of the closure arm 82 is preferably expanded during the performance of forming operations on the closure arm to provide the smoothly curved guiding surface as shown in FIG. 11. Such guiding surface enables the closure arm to be pivoted about the pin 96 by contact with the end 18 of the coupling nozzle 16 to facilitate insertion of the coupling nozzle 16 into the tubular connector body 20. As shown in FIG. 2, the closure arm 24 will rest against the coupling nozzle 16 when it is inserted in the tubular connector body and it will thus be in a position to move immediately into contact with the projecting end of the tubular connector body 20 under the influence of the resilient tongue 34 immediately upon removal of the coupling nozzle 16 from the tubular connector body 20. It will be understood that the cap 90 on the closure arm 24 is adapted to provide an airtight seal when in contact with the projecting end of the tubular connector body 20. Since the interior of the manifold 12 is at sub-atmospheric pressure, the resilient tongue 34 need only bring the cap 90 into contact with the projecting end of the tubular connector body and the airtight seal will automatically tend to result due to atmospheric pressure acting on the cap 90.

It has been found that a coupling means made in accordance with the teaching of this invention may be quickly and easily mounted on a manifold by hand and without the use of any special tools. Similarly, the coupling means may be easily removed from the manifold by hand and without the use of any special tools. However, when the coupling means is in place, it provides an efficient and dependent seal to the manifold and a quick and convenient means for the attachment of a milking machine thereto.

The great majority of milking systems include tubular manifolds 12 having an external diameter of 2 inches (5 cm). Thus, in the first preferred embodiment of this invention, the elongated member 22 is about 6 inches (15 cm) long including a lip 42 having a length of 0.5 inch (1 cm). When the bight 40 is formed in the elongated member, care must be taken to insure that the remaining effective length of the elongated member exceeds half the length of the periphery of the manifold and such remaining effective length is preferably about 4 inches (10 cm).

In the first preferred embodiment the circular opening 30 has a diameter of 0.6 inch (1.5 cm). The rectangular opening has a length of about 3 inches (7.5 cm) and a width of about 0.53 inch (1.7 cm). The tongue has a length of 1.5 inches (4 cm) and a width of about 0.3 inch (0.75 cm).

In forming the above elongated member into the desired generally "C"-shaped cross-section, the internal surface of the portion thereof from the end adjacent the circular hole 30 to the bight has a radius of curvature about a given center equal to the external radius of the manifold or about 1 inch (2.5 cm). The radius of curvature of the internal surface of the remainder of the elongated member is reduced by about ten percent to 0.9 inch (2.25 cm) about a center which is displaced from the given center toward the bight 40 by 0.1 inch (0.25 cm) and toward the circular opening 30 by 0.2 inch (0.5 cm). The internal surface of the tongue is provided with a radius of curvature about ten percent greater than the radius of the manifold or 1.1 inch (2.8 cm) about a center which is displaced from the given center toward the bight by 0.28 inch (0.7 cm) and toward the circular opening by 0.4 inch (1 cm).

The closure arm of the preferred embodiment has a length of 4.25 inches (10 cm) prior to forming into an "L"-shape with a first leg 80 about 1.5 inch (3.8 cm) long and a second leg 82 about 1.8 inch (4.5 cm) long. The balance of the length of closure arm forms the bight 84, channel 86 and lip 88.

The above dimensions are given by way of example only and are subject to variation except as noted. The dimensions and locations of openings and notches not specifically given above are preferably located and sized in the proportions shown in the drawing but are subject to variation without departing from the teaching of this invention.

Turning to FIG. 14, a second embodiment of the present invention is illustrated, wherein connector body 10' is mounted on the manifold with the closure arm 24 in its normal position when no milking machine is connected there. The manifold 12 is shown in cross-section together with the tubular member 20 and a portion of the elongated member 22' adjacent the tubular member 20. The remainder of the connector body 10' is shown in full. The elongated member 22' is made of flat steel stock. The circular opening 30 through which tubular member 20 is fixed, as well as generally rectangular opening 32' (best seen in FIGS. 15 and 17), are preferably formed in the flat steel stock by a punching operation prior to forming the elongated member 22' into a generally curved cross-section. As best shown in FIG. 17, the generally rectangular opening 32' extends along the axis of elongation of the member 22'. Integrally joined with member 22' at a point 100, illustrated at FIG. 16, by means such as rivet 102 adjacent the rectangular opening 32' end more near circular opening 30. At the opposite end of the rectangular opening 32' the elongated member 22' is provided with an outwardly protruding portion preferably formed to provide a bight 40 or in the embodiment of FIG. 3. Tongue 34' extends longitudinally with respect to the rectangular opening 32' to a point adjacent bight 40. The free end of tongue 34' is formed with shoulders 36'.

As may be seen in FIGS. 14 and 16, the tongue 34', including the shoulders 36', is free to flex with respect to elongated member 22'. More importantly, the tongue 34' together with the shoulders 36' is freely received within opening 32', as seen more clearly in FIG. 17.

Closure arm 24 is formed and assembled with connector body 10' as previously described and illustrated by FIGS. 8, 9, 10, 11 and 12. Thus, the free end of the leg 82 of the closure arm 24 is positioned within rectangular opening 32' in the elongated member 22' with the channel 86 aligned with the bight 40 and the notch 72 in engagement with tongue 34'. The pin 96 is then inserted through the bight 40 of the elongated member 22' in engagement with the channel 86 of the closure arm 24. The tongue 34' will resiliently urge the channel 86 of the closure arm 24 into compressive contact with the pin 96 and will also tend to pivot the closure arm 24 about the pin 96 to bring the planar surface 94 of the cap 90 into compressive contact with the outwardly projecting end of the tubular body 20.

As will best be understood by comparing FIG. 17 to FIG. 4, the notch 72 in end of closure arm 24 will cooperate with the shoulders 36' on the tongue 34' to limit rotational movement of the closure arm 24 when the cap 90 is removed from the projecting end of the tubular connector body 20 to permit insertion of the coupling nozzle 16 therein.

Also, as shown in FIG. 13, the central portion 98 of the pivot pin 96 may be slightly upset to insure that once the pivot pin has been inserted in the bight 40 of the elongated member 22' with the channel 86 of the closure arm 24 compressively urged thereagainst by the resilient tongue 34', such pivot pin 96 will be captured against axial movement and thus cannot slip out of the desired engagement with the bight 40 and channel 86.

The closure arm 24 is preferably not subjected to heat treatment for hardening the same and thus it is possible to bend the closure arm 24 slightly to insure proper seating of the cap 90 on the projecting end of the tubular connector body 20. The second opening 76 through the leg 82 of the closure arm 24 enables a slight bending of the closure arm 24 under the influence of sufficient force to facilitate the desired adjustment. In addition, and referring specifically to FIG. 11, the notch 74 in the free end of the leg 80 of the closure arm 82 is preferably expanded during the performance of forming operations on the closure arm to provide the smoothly curved guiding surface as shown in FIG. 11. Such guiding surface enables the closure arm to be pivoted about the pin 96 by contact with the end 18 of the coupling nozzle 16 to facilitate insertion of the coupling nozzle 16 into the tubular connector body 20. As shown in FIG. 2, the closure arm 24 will rest against the coupling nozzle 16 when it is inserted in the tubular connector body and it will thus be in a position to move immediately into contact with the projecting end of the tubular connector body 20 under the influence of the resilient tongue 34' immediately upon removal of the coupling nozzle 16 from the tubular connector body 20. It will be understood that the cap 90 on the closure arm 24 is adapted to provide an airtight seal when in contact with the projecting end of the tubular connector body 20. Since the interior of the manifold 12 is at sub-atmospheric pressure, the resilient tongue 34' need only bring the cap 90 into contact with the projecting end of the tubular connector body and the airtight seal will automatically tend to result due to atmospheric pressure acting on the cap 90.

As best illustrated by FIG. 16, the connector body 10' preferably further includes a pair of arms 104,106, one end of each arm attached to the elongated member 22' at points 108 and 100 of elongated member 22', points 108 and 100 being on opposite sides of circular opening 30. The attachment may be by means of any conventional attaching member, such as rivet 110 and rivet 102 herein shown. The free ends 112,114 of arms 104,106 are adjustably attached to each other. As illustrated, arms 104,106 and attachment member 116 comprise an airplane type hose clamp in which a worm gear fixed to one arm 104 cooperates with slots in the other arm 106 to adjustably attach the arms 104 and 106 to each other as is known in the art.

From the above, it will be understood that the coupling means of this invention may be easily and inexpensively fabricated from a minimum of parts. Nevertheless, the coupling means has been found to provide superior characteristics in use since it closes automatically to prevent the entry of excess air into the manifold upon connection or disconnection of the coupling nozzle thereto. The rubber O-ring prevents any accumulation of milk or other contaminants at the interconnection between the coupling means and the manifold, insuring a cleanliness approaching maximum with maintenance requirements approaching a minimum. Thus it is possible to provide a coupling means according to the teaching of this invention at any point in the system where necessary of desirable with little effort and expense and without adversely affecting the system.

What is claimed is:

1. In a milking system comprising a tubular manifold having an opening through the wall thereof, a connector body adapted for connecting a milking hose to said manifold adapted to be matingly fitted through said opening in said manifold and clamp means for mounting said connector body on said manifold, the improvement wherein said connector body comprises:
   a. an elongated member of flat steel stock formed to provide a curved cross-section dimensioned to conform to the external periphery of said tubular manifold and having a circular opening at one end thereof, said elongated member having a generally rectangular opening therethrough spaced from said circular opening and being formed with an externally protruding bight extending transversely of said elongated member at a point spaced from the end of said rectangular opening adjacent said circular opening;
   b. a length of thin wall tubing fixed through said circular opening at said one end of said elongated member and projecting inwardly of said curved cross-section a distance about equal to the wall thickness of the tubular manifold, the other end of said tubular connector body extending outwardly of said curved cross-section;
   c. an O-ring surrounding said inwardly projecting tubing within said curved cross-section;
   d. tongue means extending longitudinally with respect to said rectangular opening, said tongue means being made integral with said elongated member adjacent said one end of said rectangular opening with the free end of said tongue means adjacent said bight;
   e. a generally "L" shaped closure arm made of flat stock steel, said closure arm having transverse dimensions adapted to be received in said rectangular opening, one leg of said closure arm being adapted to selectively close the outwardly projecting end of said tubing and the end of the other leg of said closure arm being provided with hinge means and having a lip extending in a direction generally parallel to said one leg adapted to engage said free end of said tongue in use; and
   f. a pin through said bight in said elongated member, said hinge means of said closure arm being engaged with said pin and said lip of said closure arm being engaged with said free end of said tongue to cause said one leg of said closure arm to resiliently close said externally projecting end of said tubing.

2. The improvement in a milking system as claimed in claim 1 wherein said one leg of said closure arm is provided with a cap means adapted to engage said externally projecting end of said tubing, said cap means being mounted on said one leg of said closure arm for limited universal movement.

3. The improvement in a milking system as claimed in claim 1 wherein the internal surface of said elongated member is cupped outwardly of said curved cross-section about said circular opening.

4. The improvement in a milking system as claimed in claim 1 wherein said hinge means provided at said end of said other leg of said closure arm comprises a bight formed in said closure arm with said lip projecting from one side thereof and a channel extending along the other side thereof to receive said pin.

5. The improvement in milking systems as claimed in claim 1 wherein said lip at said end of said other leg of said closure arm is provided with a notch adapted to receive the width of said tongue means and the free end of said tongue means is provided with shoulders adapted to engage the notch end of said other leg of said closure arm.

6. The improvement in milking systems as claimed in claim 2 wherein said end of said one leg of said closure arm is provided with an expanded notch and said cap means is mounted on said one leg of said closure arm at a point spaced from the end thereof.

7. The improvement in milking systems as claimed in claim 1 wherein said clamp means further includes a pair of arm members, one end of each said arm members attached to said elongated member, the free ends of said arm members being adjustably attached to each other.

8. In a milking system comprising a tubular manifold having an opening through the wall thereof, a tubular body adapted for connecting a milking hose to said manifold and matingly fitted through said opening in said manifold and clamp means for mounting said tubular body on said manifold, the improvement wherein:

a. said clamp means comprises an elongated member of flat spring steel stock having a length greater than one half of the length of the periphery of said tubular manifold formed to provide a generally "C" shaped cross-section dimensioned to compressively receive said tubular manifold and having a circular opening at one end thereof for receiving said tubular body therethrough, said elongated member having a generally rectangular opening therethrough intermediate said ends and being formed with an externally protruding bight extending transversely of said elongated member at a point spaced from the end of said rectangular opening adjacent said circular opening toward the other end thereof, the other end of said rectangular opening having tongue means formed therein extending longitudinally of said elongated member with the free end of said tongue adjacent said bight;

b. said tubular body comprises a length of thin wall tubing fixed through said circular opening at said one end of said elongated member and projecting inwardly of said "C" shape cross-section a distance about equal to the wall thickness of the tubular manifold;

c. an O-ring surrounds said inwardly projecting tubular body within said "C" shape cross-section;

d. a generally "L" shape closure arm made of flat stock steel is provided, said closure arm having transverse dimensions adapted to be received in said rectangular opening, one leg of said closure arm being adapted to selectively close the outwardly projecting end of said tubular body and the end of the other leg of said closure arm being provided with hinge means and having a lip extending in a direction generally parallel to said one leg adapted to engage said free end of said tongue in use; and e. a pin is provided through said bight in said elongated member, said hinge means of said closure arm being engaged with said pin and said lip of said closure arm being engaged with said free end of said tongue to cause said one leg of said closure arm to resiliently close said externally projecting end of said tubular body.

9. The improvement in a milking system as claimed in claim 8 wherein said one leg of said closure arm is provided with a cap means adapted to engage said externally projecting end of said tubular body, said cap means being mounted on said one leg of said closure arm for limited universal movement.

10. The improvement in a milking system as claimed in claim 8 wherein the generally "C" shaped cross-section includes a first portion extending from said one end of said elongated member to said bight having a circular internal surface with a radius about a first center equal to the radius of the external surface of said manifold and a second portion extending from said bight to the other end of said elongated member having a circular internal surface with a radius about 10% less than the radius of the external surface of said manifold and about a second center spaced from said first center toward said bight and toward said circular opening in said elongated member, and said tongue means has a circular internal surface with a radius about 10% greater than the radius of the external surface of said tubular manifold about a third center spaced from said second center toward said bight and toward said circular opening in said elongated member.

11. The improvement in a milking system as claimed in claim 8 wherein the internal surface of said elongated member is cupped outwardly of said "C" shape about said circular opening and the other end of said elongated member is provided with a lip projecting generally radially outward of said "C" shape.

12. The improvement in a milking system as claimed in claim 8 wherein said hinge means provided at said end of said other leg of said closure arm comprises a bight formed in said closure arm with said lip projecting from one side thereof and a channel extending along the other side thereof to receive said pin.

13. The improvement in milking systems as claimed in claim 8 wherein said lip at said end of said other leg of said closure arm is provided with a notch adapted to receive the width of said tongue means and the free end of said tongue means is provided with shoulders adapted to engage the notched end of said other leg of said closure arm.

14. The improvement in milking system as claimed in claim 9 wherein said end of said one leg of said closure arm is provided with an expanded notch and said cap means is mounted on said one leg of said closure arm at a point spaced from the end thereof.

15. The method of making a clamp means for mounting a tubular body on the tubular manifold of a milking system through an opening in the wall thereof, said method comprising the steps of:

a. forming said tubular body of a length of thin wall tubing;

b. forming a first elongated member of flat spring steel stock having a length greater than half of the length of the periphery of the tubular manifold of the milking system;

c. forming a circular opening through said first elongated member at one end thereof and forming a generally rectangular opening through said first elongated member intermediate the ends thereof with tongue means formed therein extending longitudinally of said elongated member from the end of said rectangular opening remote from said circular opening to a free end spaced from the other end thereof;

d. forming said first elongated member to provide a generally "C" shaped cross-section dimensioned to compressively receive said tubular manifold with an externally protruding bight extending transversely of said first elongated member at a point intermediate said other end of said rectangular opening and the free end of said tongue means;

e. heat treating said first elongated member to harden it as formed;

f. fixing said tubular body through said circular opening with one end thereof projecting inwardly of said "C" shaped cross-section a distance about equal to the wall thickness of said tubular manifold and the other end thereof projecting outwardly a greater distance which is less than half the radius of said tubular manifold;

g. forming a second elongated member of flat stock steel having a length greater than one quarter of the length of the periphery of said manifold and a width less than the width of said rectangular opening through said first elongated member;

h. forming said second elongated member to provide a generally "L" shaped cross-section having first and second legs with hinge means at one end of said second leg including a lip extending in a direction generally parallel to said first leg thereof; and i. positioning said second elongated member with said lip in compressive engagement with said free end of said tongue means and said hinge means aligned with said bight of said first elongated member;

j. passing a pin through said hinge means of said second elongated member and said bight of said first elongated member whereby said first and second elongated members are rotatably mounted to each other by said pin and said first leg of said second elongated member is urged toward said other end of said tubular body.

16. The method of claim 15 including the additional steps of interposing a cap member having a flat surface between said first leg of said generally "L" shaped cross-section of said second elongated member and said tubular body with said flat surface in contact with said outwardly projecting end of said tubular body and mounting said cap member on said first leg for limited universal movement.

17. The method of claim 16 including the additional step of bending said generally "L" shaped cross-section of said second elongated member to provide a desired relationship between said cap member and said outwardly projecting end of said tubular body.

* * * * *